Sept. 29, 1959     J. E. BOCK     2,906,052
SPINNING FISH LURE
Filed July 12, 1957
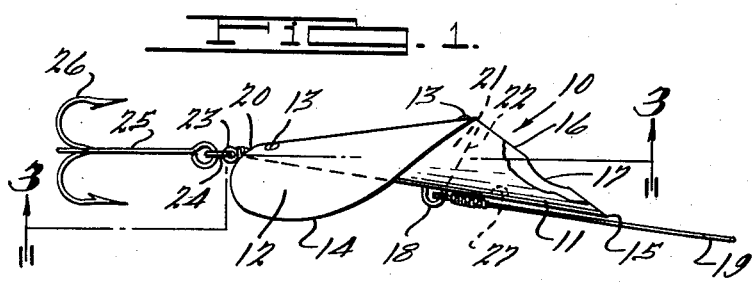
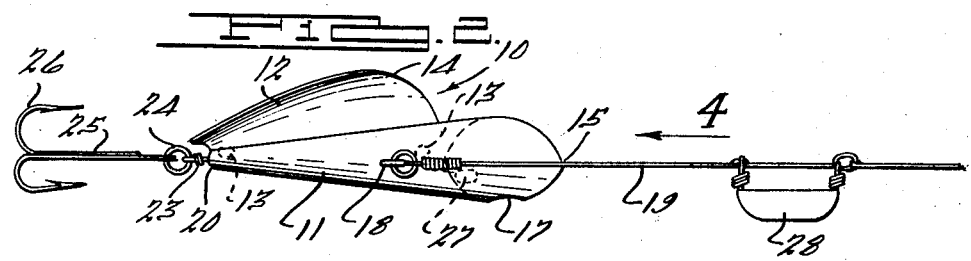
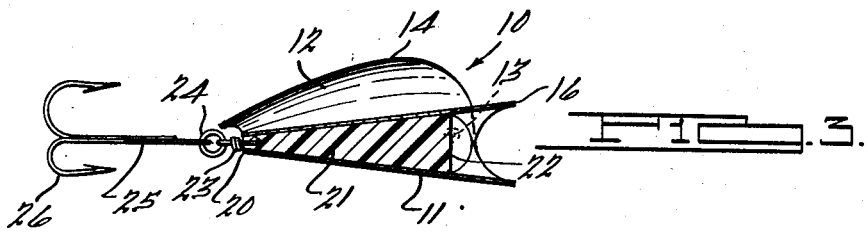
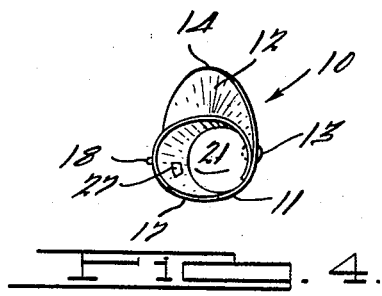
INVENTOR.
John E. Bock.
BY
John Joseph Roethel
ATTORNEY.

2,906,052

SPINNING FISH LURE

John E. Bock, Detroit, Mich.

Application July 12, 1957, Serial No. 671,530

4 Claims. (Cl. 43—42.46)

This invention relates in general to a fishing lure and more particularly to a spinning lure of the general class especially adapted for casting or trolling.

More particularly the present invention relates to a casting or trolling spinning lure comprising a hollow conical body portion having a convolute fin wrapped partially therearound. A portion of the body portion is filled with a suitable filler material to add stabilizing weight to the lure. Suitable provision is made for the attachment of hook means and a leader for securing the lure on a fishing line.

It is an object of the present invention to provide a novel fish lure capable, when being dragged through the water, of providing spinning and darting erratic movements thereby providing attractive bait for game fish.

Further objects, advantages and the features of construction embodying the present invention will be apparent from the following description and appended claims, reference being had to the accompanying drawing forming a part of this specification wherein like reference numerals designate corresponding parts in the several views.

Fig. 1 illustrates a plan elevation of the fish lure.

Fig. 2 is a side elevation of Fig. 1.

Fig. 3 is a sectional view taken substantially through line 3—3 of Figure 1 looking in the direction of the arrows.

Fig. 4 is an end view looking substantially in the direction of the arrow 4 in Fig. 2.

Before explaining in detail the present invention it is to be understood that the invention is not limited in its application to the details of construction and arrangement of parts illustrated in the accompanying drawing, since the invention is capable of other embodiments and of being carried out in various ways. Also it is to be understood that the phraseology or terminology employed herein is for the purpose of description and not of limitation.

In the drawing there is illustrated a preferred embodiment of the fish lure, generally designated 10, embodying the present invention. The fish lure 10 comprises an elongated conical body portion 11 having its greatest cross-sectional area at the fore-end and its tip at the aft-end and a convolute fin or fluted portion 12. Preferably, the body member 11 and the fin or fluted portion 12 are formed from a single sheet of material, preferably a light gage metal. The sheet is rolled to form the conical portion 11, there being a longitudinal area, see Fig. 4, along which the conical portion is provided with a double wall thickness where the sheet material is permitted to overlap itself. At least two blind rivets 13, defining a rivet line, are provided to secure the two wall thickness together thereby ensuring permanency of the conical shape of the body portion 11.

From the rivet line the sheet material is spirally curved to provide the convolute fin or fluted portion 12 which tapers arcuately and inwardly in a rearward direction in a convolute manner so as to wrap half-around the diminishing cross section of the body portion as the latter tapers toward the rear. As shown in Fig. 1, the fin wraps around the body portion to the extent that the peak of the curvilinear trailing edge 14 lies substantially in the same plane as the leading edge 15 of the body portion.

It will be noted that the front face 16 of the lure is cut back at a plane angularly inclined to the longitudinal axis of the lure, as viewed from the top thereof as in Fig. 1. The lure front face thus has an elliptical appearance with the major axis lying in a substantially horizontal plane when viewed from the front, as appears in Fig. 4. In its normal operative appearance, when viewed from the top, the lure body portion 11 has a scoop-like appearance with the scoop being turned on its side. It will be noted that the rivet line or the tangential line of connection of the fin to the body also lies substantially on the horizontal plane having the major axis of the front face of the lure conical body.

It will be noted that the lower edge of the scoop-like front portion of the body portion is arcuately cut back at 17 for a purpose to be hereinafter explained.

On a line substantially diametrically opposite the rivet line, the body member is provided with an eye 18 to which the leader 19 is adapted to be attached. As best seen in Fig. 2, the eye is located substantially centrally of the leading edge 15 and the cone tip 20 of the body portion 11.

In order to provide controlled buoyancy of the lure, a substantial portion of the hollow conical interior is filled with a suitable plastic or other equivalent filler material 21. It will be noted, see Fig. 1, that the plane of the surface 22 of the filler material is at substantially a right angle to the plane of the front face of the body portion.

Suitably anchored in the cone tip or tail portion 20 of the body portion 11 is a swivel link 23 to which a split ring 24 is adapted to be connected. The spirit ring 24 receives the shank 25 of the gang hook 26.

A small weight 27 is secured to the inner side of the body portion between the filler material 21 and the leading edge 15, the weight being positioned to dynamically counterbalance the double wall thickness and the weight of the rivets.

In operation, the lure upon being dropped into the water initially assumes the position shown in Fig. 1. In this operative position the eye 18 to which the leader is connected lies on one side. Or, with reference to Fig. 4, the major axis of the elliptical appearing front face of the lure lies in a horizontal plane.

As the lure is retrieved or pulled through the water a series of unbalanced forces are brought into play which create the spinning action of the lure. These forces may be explained as follows: The action of the water against the open scoop face 16 tends to cause rotation of the lure in a counterclockwise direction (Fig. 4) about the horizontal longitudinal axis of the lure. The counterclockwise rotation force is initially balanced to a great extent by the water pressure acting on the underside of the fin 12, this force acting to cause clockwise rotation. As the forward movement progresses the angle faced front end of the lure bodily shifts in the horizontal plane to the left and the rear or hook end shifts to the right of the line of forward movement, the directional shifts being as they would be observed facing the front of the lure as it was being drawn toward the observer. The bodily shifting or swinging movement continues until the front face 16 of the lure is substantially broadside to the direction of movement. At this point the force acting on the fin tending to cause clockwise rotation is at a minimum. The lure will suddenly flip or spin a half revolution counterclockwise about its longitudinal axis and will be restored to its position in which the longitudinal axis thereof extends parallel to the direction of movement. This, of course, is only a momentary condition. As the retrieving motion is continued, the lure continues to turn in a counterclockwise direction in a series of half revolutions. The frequency of the cycle is dependent on the rate of retrieving or trolling movement through the water.

The arcuate cut-back 17 mentioned above provides a release path for the water trapped within the scoop face 16, particularly when the scoop face 16 is broadside to the direction of movement.

A metal leader of proper stiffness and the weighted keel 28 are important adjuncts to the proper actuation of the lure. The inertia of the keel 28 acts to stabilize the forward motion of the lure by preventing sudden up or down lunging movements as the lure turns in half revolution steps.

It will be readily apparent that the lure, though illustrated as being fabricated of metal, may be molded or formed of suitable plastic material or may be made of a plastic body with a metal fin secured thereto. It will also be understood that the proportions of the lure may vary from that illustrated depending on the size lure desired.

I claim:

1. A fish lure comprising a conical body having its greatest cross-sectional area at the fore-end and its tip at the aft-end, a convolute fin extending tangentially from said conical body, said fin tapering arcuately so as to wrap partially around the rear portion of said conical body, the fore-end face of said body being at a rearwardly inclined angle to the longitudinal axis whereby said fore-end face is an ellipse, the tangential line of connection of said fin to the body lying on the diametral plane including the major axis of said elliptical fore-end face, and fish snaring means attached to said tip.

2. A fish lure comprising a conical body having its greatest cross-sectional area at the fore-end and its tip at the aft-end, a convolute fin beginning at a point intermediate the ends of said conical body, said fin tapering arcuately and inwardly toward said aft-end so as to wrap half-around the rear portion of said conical body, the fore-end face of said body being at a rearwardly inclined angle to the longitudinal axis thereof, a line receiving eye externally located on said body substantially centrally of the leading edge of said fore-end and said tip, and fish snaring means attached to said tip.

3. A fish lure comprising a conical body having its greatest cross-sectional area at the fore-end and its tip at the aft-end, a convolute fin extending tangentially from said conical body, said fin tapering arcuately so as to wrap partially around the rear portion of said conical body, the fore-end face of said body being at a rearwardly inclined angle to the longitudinal axis whereby said fore-end face is an ellipse, the tangential line of connection of said fin to the body lying on the diametrical plane including the major axis of said elliptical face, said conical body portion having a hollow portion behind said fore-end face whereby the latter appears as a scoop, a line receiving eye externally located on said body substantially centrally of the leading edge of said fore-end and tip and diametrically opposite said tangential line of connection, and fish snaring means attached to said tip.

4. A fish lure comprising a conical body having its greatest cross-sectional area at the fore-end and its tip at the aft-end, a convolute fin extending tangentially from said conical body, said fin tapering arcuately so as to wrap partially around the rear portion of said conical body, the fore-end face of said body being at a rearwardly inclined angle to the longitudinal axis thereof, said fore-end face having an elliptical appearance with the major diameter of the ellipse lying in a horizontal plane, the tangential line of connection of said fin to said conical body lying in said horizontal plane, said conical body portion having a hollow portion behind said fore-end face whereby the latter appears as a scoop, a line receiving eye externally located on said body intermediate the leading edge of said fore-end and tip and diametrically opposite said tangential line of connection, and fish snaring means attached to said tip.

References Cited in the file of this patent

UNITED STATES PATENTS

| | | |
|---|---|---|
| 2,119,417 | Brown | May 31, 1938 |
| 2,443,124 | Sullivan | June 8, 1948 |